(12) United States Patent
Fujimoto et al.

(10) Patent No.: US 7,352,402 B2
(45) Date of Patent: Apr. 1, 2008

(54) IMAGE SENSOR MODULE AND METHOD OF MAKING THE SAME

(75) Inventors: Hisayoshi Fujimoto, Kyoto (JP); Hiroaki Onishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 651 days.

(21) Appl. No.: 10/436,455

(22) Filed: May 12, 2003

(65) Prior Publication Data
US 2004/0109079 A1 Jun. 10, 2004

(30) Foreign Application Priority Data
May 13, 2002 (JP) ............................. 2002-136793

(51) Int. Cl.
*H04N 5/225* (2006.01)

(52) U.S. Cl. ........................ 348/340; 359/819; 348/373

(58) Field of Classification Search ................ 348/340, 348/294, 373, 375; 359/819, 529; 396/530, 396/533, 529; 257/291, 415, 433, 432, 678, 257/684, 693, 730, 731, 797, 796, 785, 779, 257/780, 781, 676, 78; 438/39, 40, 459
See application file for complete search history.

(56) References Cited

U.S. PATENT DOCUMENTS 5,189,716 A * 2/1993 Matsubara et al. ........... 385/93

6,469,844 B1 * 10/2002 Iwase et al. ................. 359/819
6,528,778 B1 * 3/2003 Kimba et al. ............. 250/214.1
2002/0005997 A1 * 1/2002 Oba ........................... 359/819

FOREIGN PATENT DOCUMENTS

JP 05022640 A * 1/1993
JP 10-41492 2/1998

OTHER PUBLICATIONS

L. McCarthy: "Part Design is Critical for Good Welds", Plastics World, vol. 48, No. 7, Jun. 1990, pp. 62-67, XP001119210-p. 62; p. 63, col. 1-p. 64, col. 1.*
English Machine Translation of JP 5-22640 (JP 05022640 A being published on Jan. 1993).*

* cited by examiner

*Primary Examiner*—Lin Ye
*Assistant Examiner*—Nelson D. Hernandez
(74) *Attorney, Agent, or Firm*—Hamre, Schumann, Mueller & Larson, P.C.

(57) ABSTRACT

An image sensor module includes a holder and a lens unit attached in the holder. The lens unit is held in the holder by at least one engagement projection formed by plastically deforming a part of the holder. Preferably, the lens unit includes a first lens spaced from the engagement projection and a second lens adjoining the engagement projection. Each of the first lens and the second lens includes a central lens portion, and a flat peripheral portion surrounding the lens portion. The flat peripheral portion of the first lens is held in contact with the flat peripheral portion of the second lens. The engagement projection engages the flat peripheral portion of the second lens.

11 Claims, 3 Drawing Sheets

IMAGE SENSOR MODULE AND METHOD OF MAKING THE SAME

BACKGROUND OF THE INVENTION

1. Field of the Invention

The present invention relates to an image sensor module for use as incorporated in a digital camera or a camera-equipped cell phone, and also relates to a method of making such an image sensor module.

2. Description of the Related Art

A prior art image sensor module has such a structure as shown in FIG. 6, for example. Specifically, the illustrated image sensor module 100 includes a lens 101 and a holder 102. The lens 101 converges light traveling from an object onto an image sensor chip 104 mounted on a substrate 103. The holder 102 supports and protects the lens 101 fitted therein. For fixedly supporting the lens 101, the holder 102 is bonded to the peripheral portion of the lens 101 with an adhesive 105. Further, the holder 102 is bonded, via an adhesive 107, to a frame 106 to the bottom of which the substrate 103 is mounted.

The prior art image sensor module 100 has the following disadvantages. Since the application of the adhesive 105, 107 is troublesome and hardening of the adhesive 105, 107 takes time, the manufacturing efficiency of the image sensor module 100 is not high. When an instant adhesive is used as the adhesive 105 and 107 for enhancing the manufacturing efficiency, the lens 101 may disadvantageously be fogged up due to the solvent contained in the instant adhesive. Moreover, since an instant adhesive is a self-hardening adhesive and hence has a relatively short spot life, it soon becomes unusable, which may lead to an increase of the cost.

SUMMARY OF THE INVENTION

It is, therefore, an object of the present invention to provide an image sensor module which makes it possible to shorten the time required for attaching a lens to a holder and to enhance the manufacturing efficiency.

Another object of the present invention is to provide a method of making such an image sensor module.

According to a first aspect of the present invention, there is provided an image sensor module comprising a holder and a lens unit attached in the holder. The lens unit is held in the holder by at least one engagement projection formed by plastically deforming a part of the holder.

With such a structure, the lens unit and the holder can be connected to each other quickly and properly without the need for an adhesive which has been used in the prior art method.

Preferably, the lens unit includes at least one lens including a central lens portion and a flat peripheral portion surrounding the lens portion, and the engagement projection engages the flat peripheral portion of the lens.

In a preferred embodiment, the lens unit includes a first lens spaced from the engagement projection and a second lens adjoining the engagement projection. Each of the first lens and the second lens includes a central lens portion and a flat peripheral portion surrounding the lens portion. The flat peripheral portion of the first lens is held in contact with the flat peripheral portion of the second lens. The engagement projection engages the flat peripheral portion of the second lens. In this embodiment, the lens portion of the first lens is spaced from the lens portion of the second lens.

Preferably, the holder is made of thermoplastic resin. In this case, the image sensor module further comprises a frame attached to the holder, and the holder includes at least one fusion projection thermally fused to the frame.

Preferably, the frame is made of a resin which is compatible with the thermoplastic resin forming the holder. Particularly, it is advantageous that the frame and the holder are made of the same kind of thermoplastic resin.

According to a second aspect of the present invention, there is provided a method of making an image sensor module including a holder and a lens unit attached in the holder. The method includes a step of plastically deforming a part of the holder to form at least one engagement projection for holding the lens unit in the holder.

Preferably, the holder is made of thermoplastic resin. In this case, the formation of the engagement projection by plastic deformation is performed by applying ultrasonic energy to the part of the holder for softening followed by deforming. More specifically, the part of the holder includes at least one tapered projection formed in advance, and the formation of the engagement projection by plastic deformation is performed by applying ultrasonic energy to the tapered projection for softening the projection and compressing the projection for deformation.

The making method according to the second aspect further comprises the step of attaching a frame to the holder, and the holder is made of thermoplastic resin. In this case, the frame attaching step is performed by thermally fusing the holder to the frame. More specifically, the holder includes at least one tapered projection formed in advance, and the frame attaching step is performed by applying ultrasonic energy to the tapered projection for plastically deforming the tapered projection for thermally fusing to the frame. Preferably, the frame supports a substrate on which an image sensor chip is mounted to face the lens unit. In this case, the thermal fusing of the tapered projection accompanied by the plastic deformation is performed until a focal point of the lens unit corresponds to a light receiving portion of the image sensor chip.

Other objects, features and advantages of the present invention will become clearer from the description of the preferred embodiment given below.

DETAILED DESCRIPTION OF THE PREFERRED EMBODIMENTS

Preferred embodiments of the present invention will be described below in detail with reference to FIGS. 1 through 5 of the accompanying drawings.

Figure 1:
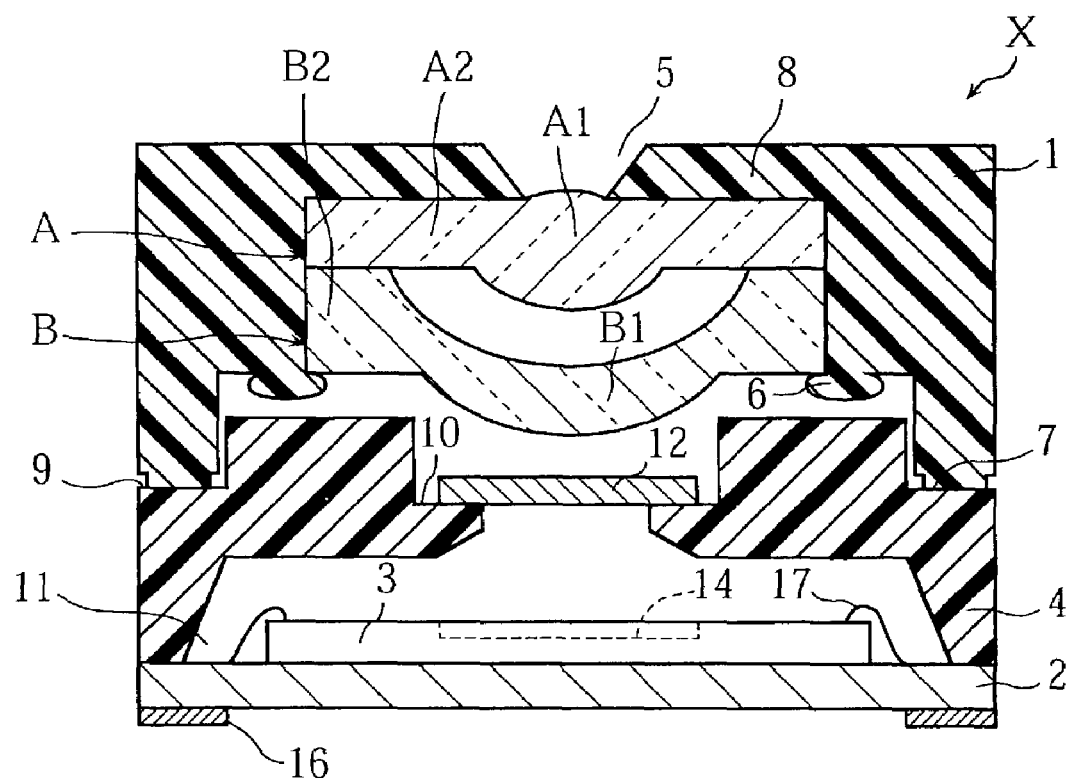
FIG. 1 is a sectional view illustrating an image sensor module embodying the present invention.

FIG. 1 illustrates an image sensor module embodying the present invention. The illustrated image sensor module X mainly comprises a first lens A, a second lens B, a holder 1 in the form of a housing for holding the lenses A and B, a substrate 2, an image sensor chip 3 mounted on the substrate 2, and a frame 4 interposed between the holder 1 and the substrate 2.

The first lens A includes a lens portion A1 provided at a center portion thereof, and a flat peripheral portion A2 surrounding the lens portion A1. Similarly, the second lens B includes a lens portion B1 provided at a center portion thereof, and a flat peripheral portion B2 surrounding the lens portion B1. The lens portions A1 and B1 converge the light traveling from an object to form an image of the object on the image sensor chip 3. The flat peripheral portions A2, B2 of the lenses A, B are held in contact with each other while closely fitted in the holder 1. Space is defined between the lens portion A1 of the lens A and the lens portion B1 of the lens B. As compared with the case where a single lens is used, the use of two lenses A and B can increase the number of apertures, prevent the distortion of a captured image and provide a clear captured image.

Figure 2:
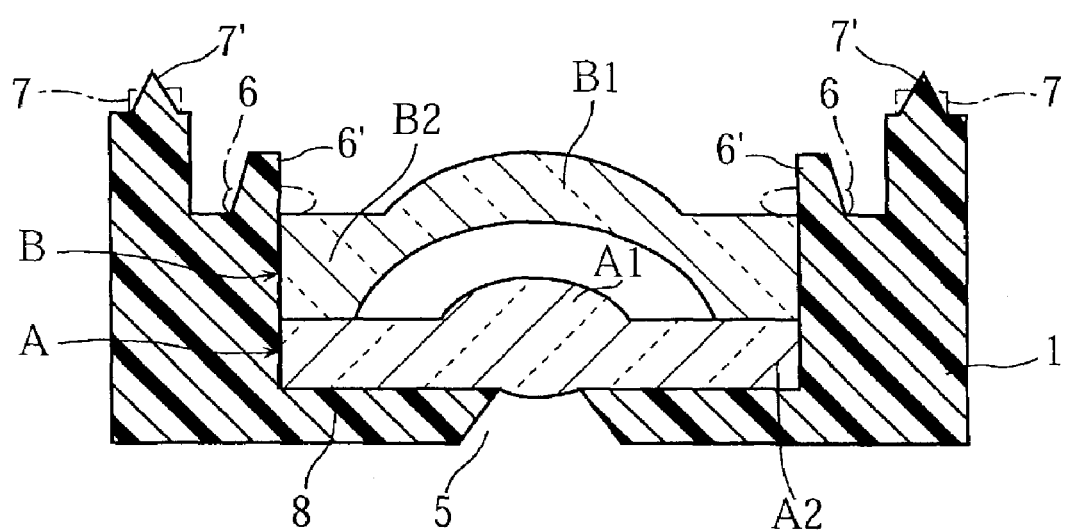
FIG. 2 is a sectional view illustrating the holder and the lens of the same image sensor module.

The holder 1 may be made of thermoplastic resin, for example. The holder 1 has a top wall 8 formed with an opening 5 for exposure. The holder 1 is provided with a plurality of engagement projections 6 for retaining the lenses A and B in the holder 1, and a plurality of fusion projections 7 for fixing the holder 1 to the frame 4. As shown in FIG. 2, the engagement projections 6 and the fusion projections 7 are formed by deforming tapered projections 6' and 7 integrally formed on the holder 1.

The frame 4 is in the form of a housing made of thermoplastic resin, for example. The frame has an upper portion formed with an outer stepped surface 9 and an inner stepped surface 10. The holder 1 is fixed to the outer stepped surface 9 via the fusion projections 7. An optical filter 12 is mounted on the inner stepped surface 10. The optical filter 12 may be an infrared cut filter, for example, for causing the image sensor chip 3 to receive light from which infrared has been cut off to provide a clear captured image. The frame 4 has a bottom portion formed with an opening 11. The substrate 2 is so mounted as to close the opening 11.

Figure 3:
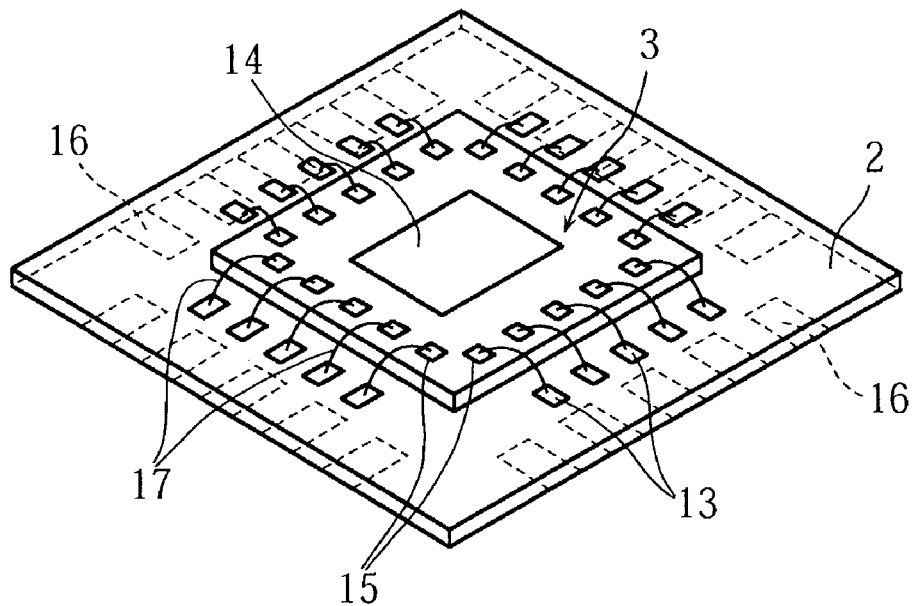
FIG. 3 is a perspective view illustrating the substrate of the same image sensor module.

As shown in FIG. 3, the substrate 2 comprises a square or oblong flat plate, for example, and has an upper surface formed with a wiring pattern provided with a plurality of conductor pads 13 (the components other than the pads are not illustrated). In the illustrated embodiment, the substrate 2 has a reverse surface provided with a plurality of terminals 16 electrically connected to the conductor pads 13. The image sensor module X can be surface-mounted by utilizing the terminals 16.

The image sensor chip 3 mounted on the substrate 2 may be a CCD or MOS solid-state image pickup device, for example. The image sensor chip 3 includes a light receiving portion 14 for receiving light passing through the two lenses A and B, a plurality of electrodes 15 connected to the conductor pads 13 through wires 17, and photo-electric conversion elements (not shown). In the image sensor chip 3, light received by the light receiving portion 14 is converted into electric charge corresponding to the received amount of light by the photo-electric conversion elements, and the electric charge is outputted through the electrodes 15.

Next, an example of method of making the image sensor module X will be described.

First, two lenses A and B are attached to a holder 1. Specifically, as shown in FIG. 2, the first lens A and the second lens B are fitted in the holder 1 as stacked so that the first lens A is sandwiched between the second lens B and a wall 8 of the holder 1. Then, in this state, ultrasonic energy is applied to tapered projections 6' to heat and soften each of the tapered projection 6'. Subsequently, the tapered projection 6' is compressed from above. As a result, the projection 6' is deformed to become an engagement projection 6 engaging the flat peripheral portion B2 of the second lens B. The first lens A is held indirectly via the second lens B. In this way, the both lenses A and B can be quickly and properly attached to the holder 1 just by heating and compressing each of the tapered portions 6'.

Separately from the work for attaching the two lenses A and B to the holder 1, an optical filter 12 is mounted to an inner stepped surface 10 of the frame 4 while a substrate 2 is mounted to the bottom of the frame 4 using an adhesive (not shown), for example. An image sensor chip 3 is mounted to the substrate 2 in advance before the substrate 2 is mounted to the bottom of the frame 4.

Figure 4:
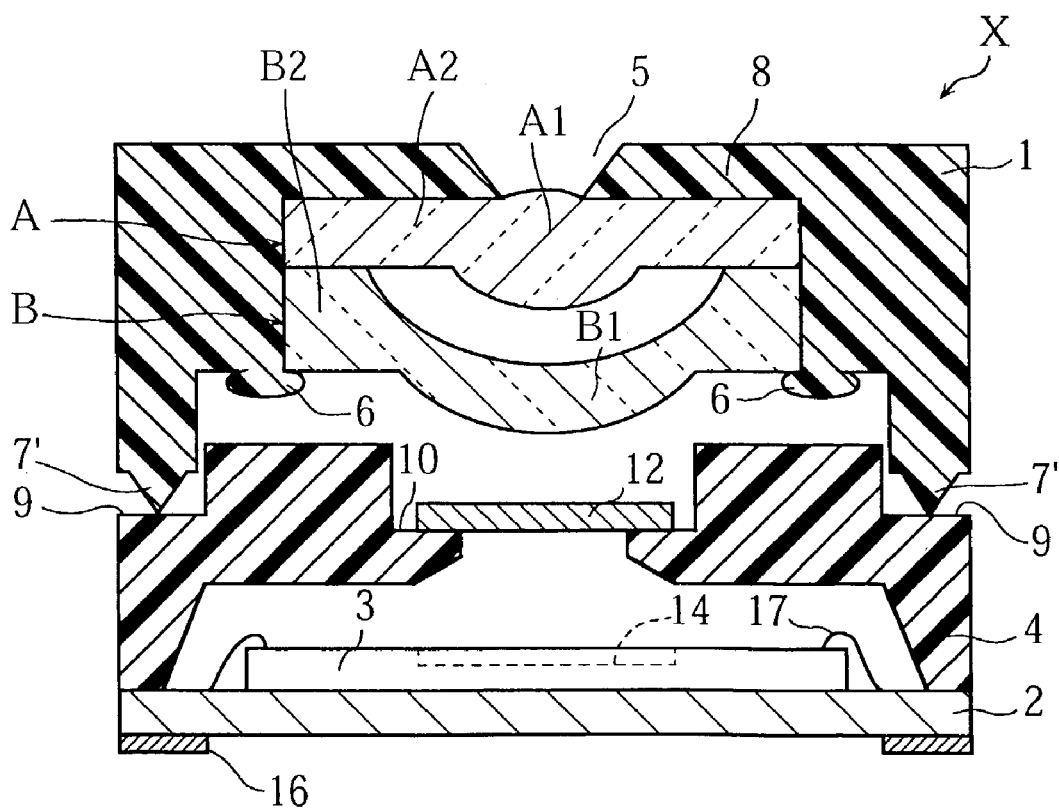
FIG. 4 is a sectional view illustrating the image sensor module in the state before the holder is connected.

Subsequently, the frame 4 and the holder 1 are connected together. Specifically, as shown in FIG. 4, the holder 1 is placed on the frame 4 so that each of the tapered projections 7' engages the outer stepped surface 9. In this state, ultrasonic energy is applied to each of the tapered projections 7' for heating and melting the projection, and the holder 1 is pressed against the frame 4. As a result, the tapered projection 7' is compressed for fusing to the frame 4 (fusion projection 7 is formed), so that the holder 1 is properly connected to the frame 4. Since no adhesive is used also in this connection, the holder 1 can be properly connected to the frame 4 quickly.

In the illustrated embodiment, the frame 4 as well as the holder 1 are made of thermoplastic resin so that the fusion projections 7 of the holder 1 can be reliably fused to the frame 4. However, the frame 4 can be made of thermosetting resin provided that it has compatibility (relevant to fusibility) with the thermoplastic resin forming the holder 1. Further, the frame 4 may be made of a material other than resin provided that the thermoplastic resin forming the holder 1 can be fused to the material.

Figure 6:
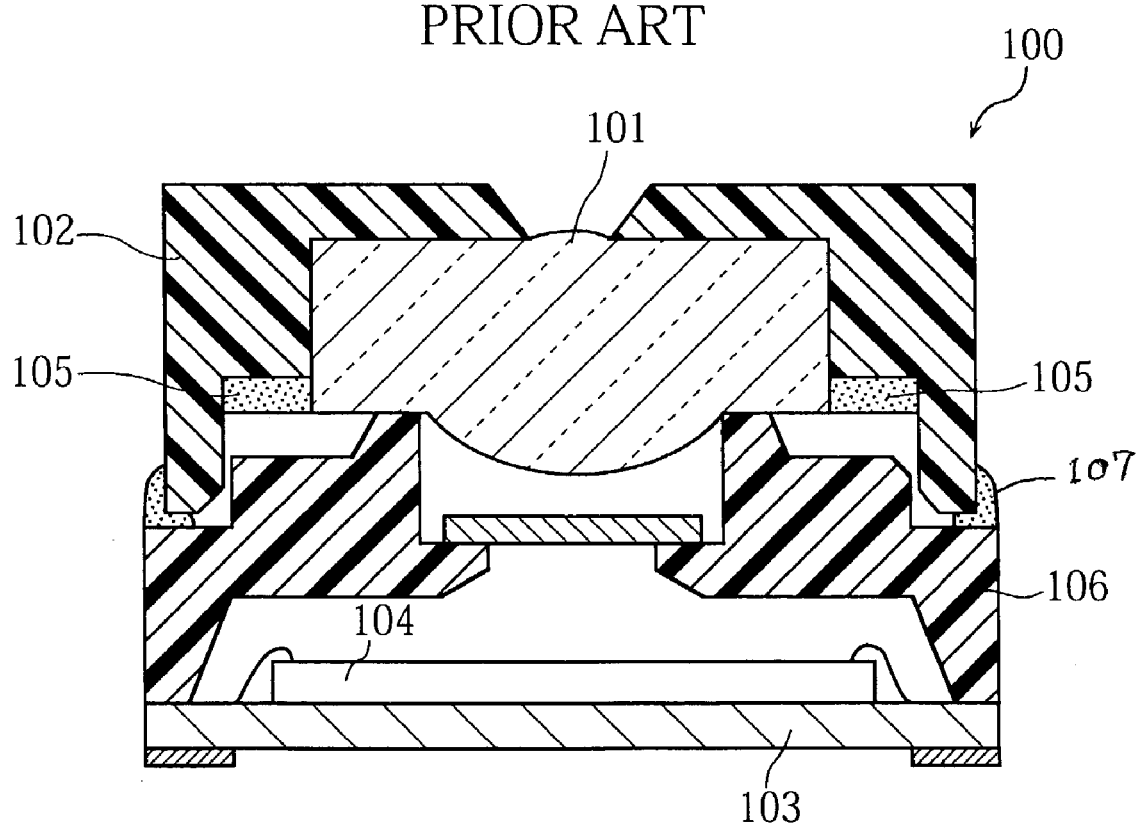
FIG. 6 is a sectional view illustrating an example of prior art image sensor module.

As described above, in the method of making the image sensor module X, both of the work for attaching the lenses A and B to the holder 1 and the work for connecting the holder 1 to the frame 4 can be performed quickly and properly without using an adhesive. Therefore, the manufacturing efficiency of an image sensor module is enhanced as compared with the prior art method in which the lens 101 is attached to the holder 102 using the adhesive 105 as shown in FIG. 6. Further, since the apparatus for applying and drying the adhesive 105 is unnecessary, the manufacturing equipment can be simplified. In heating the projections 6' using ultrasonic energy, the ultrasonic generator can be brought into contact only with the projections 6'. Therefore, damage to the two lenses A and B due to the contact with the ultrasonic generator can be avoided. Moreover, since the holder 1 is provided separately from the frame 4, the distance between the lenses A, B and the light receiving portion 14 can be adjusted (i.e. focus adjustment) by adjusting the deforming amount of the tapered projections 7' in connecting these members to each other.

Figure 5:
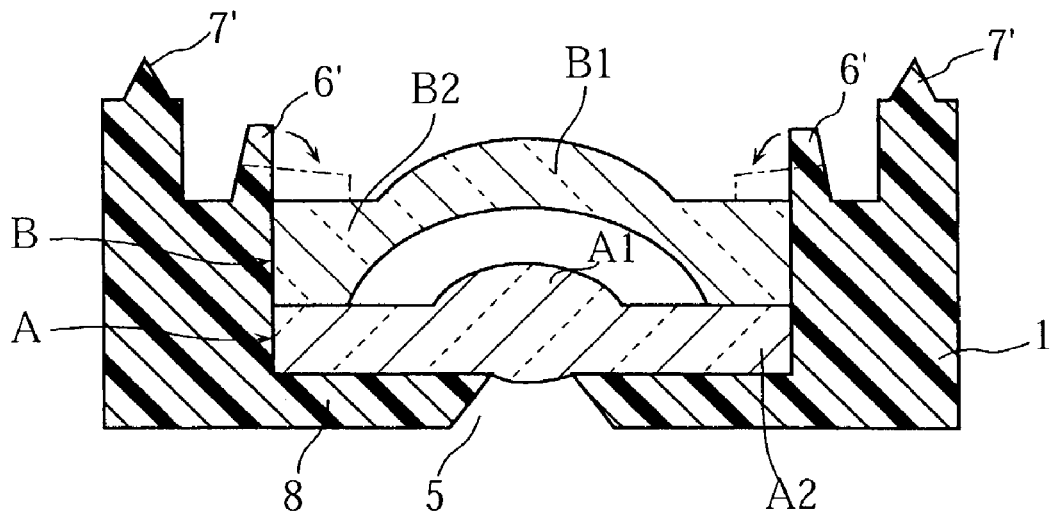
FIG. 5 is a sectional view illustrating a variation of the above-described embodiment.

FIG. 5 illustrates a variation of method for deforming the tapered projections 6' for engagement with the second lens B. In this variation, each of the tapered projections 6' plasticized by heating or the like is bent toward the second lens B. Also with such a structure, both lenses A and B can be properly held in the holder 1.

The present invention is not limited to the above-described embodiments but may be varied in many ways as far as it does not depart from the spirit of the present invention.

For example, instead of the plurality of engagement projections 6, a single annular engagement projection may be used for holding the lenses A and B. Similarly, a single annular fusion projection may be used for connecting the holder 1 to the frame 4 instead of the plurality of fusion projections 7. Further, instead of the fusion projections 7, an adhesive may be used for connecting the holder 1 to the frame 4.

The invention claimed is:

1. An image sensor module comprising: a holder; a lens unit attached in the holder and having a focal point; a frame attached to the holder; a substrate supported by the frame; and an image sensor chip mounted on the substrate, the image sensor chip provided with a light receiving portion facing the lens unit;

the lens unit held in the holder by at least one engagement projection formed by plastically deforming a part of the holder, and the holder comprising at least one tapered fusion projection, the tapered fusion projection being pointed toward the frame and subjected to thermal fusing to attach the holder to the frame and an application of ultrasonic energy to plastically deform the tapered projection, the thermal fusing and plastic deformation of the tapered fusion projection being performed until the focal point of the lens unit corresponds to the light receiving portion of the image sensor chip.

2. The image sensor module according to claim 1, wherein the lens unit includes at least one lens including a central lens portion and a flat peripheral portion surrounding the lens portion, the engagement projection engaging the flat peripheral portion of the lens.

3. The image sensor module according to claim 1, wherein the lens unit includes a first lens spaced from the engagement projection and a second lens adjoining the engagement projection, each of the first lens and the second lens including a central lens portion and a flat peripheral portion surrounding the lens portion, the flat peripheral portion of the first lens being held in contact with the flat peripheral portion of the second lens, the engagement projection engaging the flat peripheral portion of the second lens.

4. The image sensor module according to claim 3, wherein the lens portion of the first lens is spaced from the lens portion of the second lens.

5. The image sensor module according to claim 1, wherein the holder is made of thermoplastic resin.

6. The image sensor module according to claim 5, wherein the frame is made of a resin which is compatible with the thermoplastic resin forming the holder.

7. The image sensor module according to claim 6, wherein the frame and the folder are made of a same kind of thermoplastic resin.

8. A method of making an image sensor module which includes a holder, a lens unit attached in the holder, and a frame attached to the holder;

the method comprising the steps of:

plastically deforming a part of the holder to form at least one engagement projection for holding the lens unit in the holder; and attaching the frame to the holder by thermally fusing a tapered projection of the holder pointing toward the frame and applying ultrasonic energy to the tapered projection to plastically deform the tapered projection;

wherein the frame supports a substrate on which an image sensor chip is mounted to face the lens unit, and the thermal fusing of the tapered projection and plastically deforming are performed until a focal point of the lens unit corresponds to a light receiving portion of the image sensor chip.

9. The method of making an image sensor module according to claim 8, wherein the holder is made of thermoplastic resin, and the formation of the engagement projection by plastic deformation is performed by applying ultrasonic energy to said part of the holder for softening followed by deforming.

10. The method of making an image sensor module according to claim 9, wherein said part of the holder includes at least one tapered projection formed in advance, and the deformation of the engagement projection by plastic deformation is performed by applying ultrasonic energy to the tapered projection for softening the projection and compressing the projection for deformation.

11. The method of making an image sensor module according to claim 8, wherein the holder is made of thermoplastic resin.

* * * * *